Patented June 23, 1925.

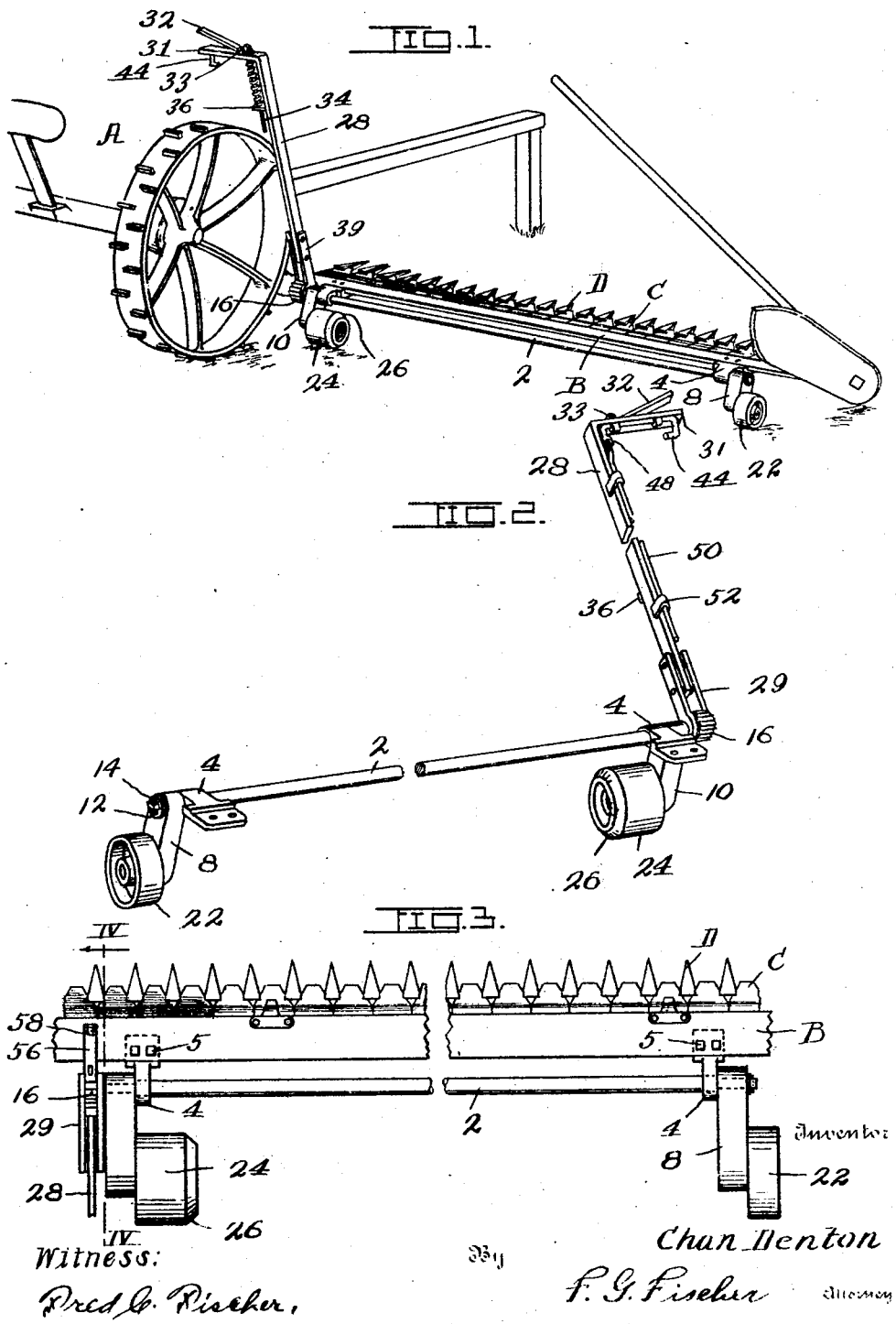

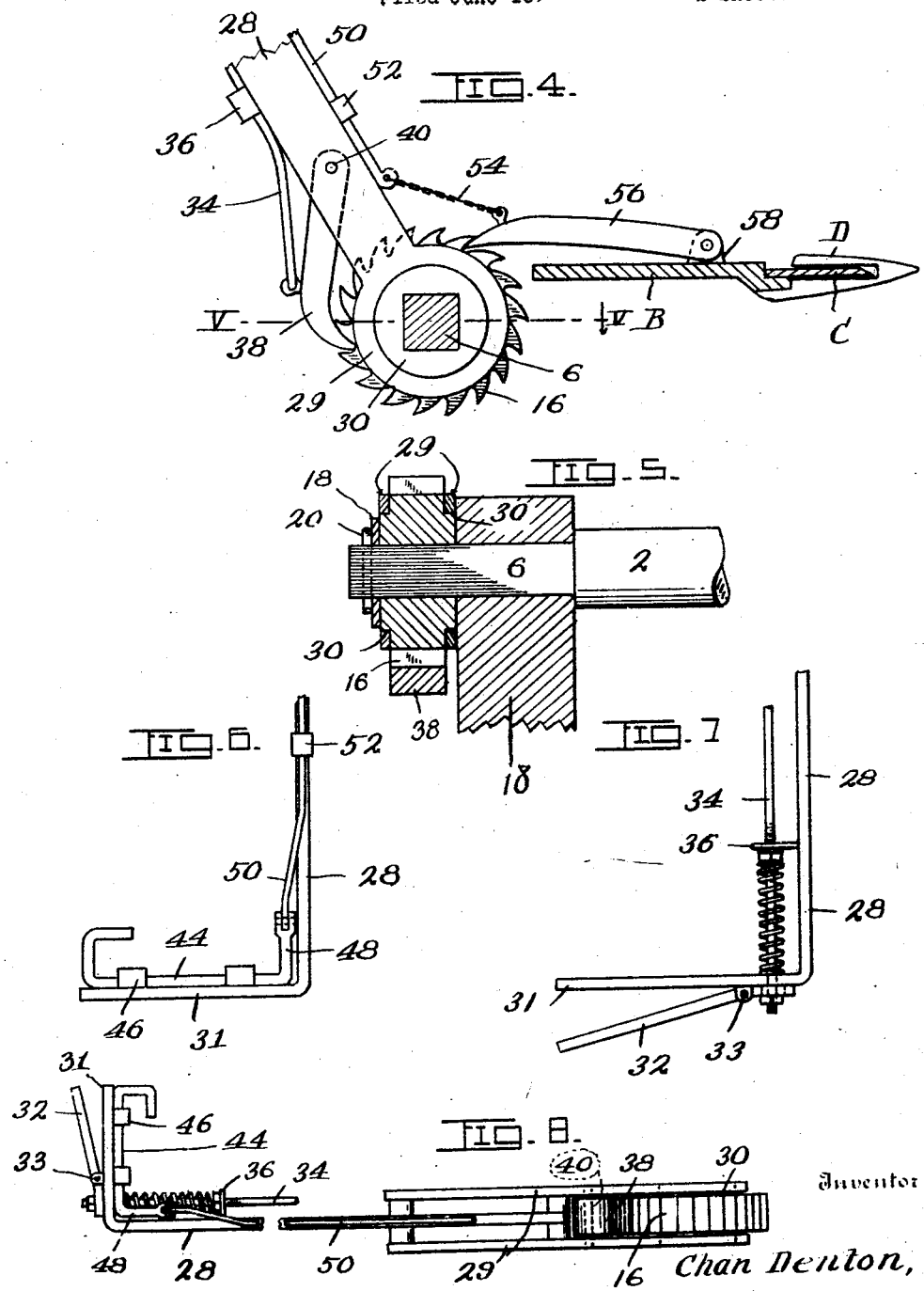

1,543,472

UNITED STATES PATENT OFFICE.

CHAN DENTON, OF COLONY, KANSAS.

ATTACHMENT FOR MOWING MACHINES.

Application filed June 16, 1923. Serial No. 645,827.

*To all whom it may concern:*

Be it known that I, CHAN DENTON, a citizen of the United States, residing at Colony, in the county of Anderson and State of Kansas, have invented certain new and useful Improvements in Attachments for Mowing Machines, of which the following is a specification.

My invention relates to attachments for mowing machines whereby the mowing mechanism of such machines may be readily adjusted up and down to cut weeds, grass, cane, etc., at different elevations from the ground, and one object is to provide a simple and inexpensive device of this character which can be readily attached to any standard make of mowing machine without requiring alterations therein.

A further object is to provide an attachment whereby weeds in a pasture may be cut without mowing the grass, by carrying the mowing mechanism at such elevation that it will pass over the grass and cut the weeds extending above such grass.
Another object is to provide an attachment of this character which will carry the weight of the mowing mechanism on antifriction means, such as wheels or rollers, and thus materially lighten the draft on the team, or tractor, and correspondingly reduce the stress on the mowing machine.

Another object is to provide an attachment which may be actuated from the driver's seat on the mowing machine while the latter is in operation.

Other objects will hereinafter appear, and in order that the invention may be fully understood, reference will now be had to the accompanying drawings, in which:
Fig. 1 is a fragmentary perspective view of a mowing machine equipped with the attachment.

Fig. 2 is a detail perspective view of the attachment removed from the mowing machine.

Fig. 3 is a broken plan view of the mowing mechanism of the mowing machine provided with the attachment.

Fig. 4 is an enlarged broken cross section on line IV—IV of Fig. 3.

Fig. 5 is a section on line V—V of Fig. 4, with some of the parts removed.

Fig. 6 is an enlarged fragmentary detail of the main lever and detent actuating mechanism mounted upon said lever.

Fig. 7 is an enlarged fragmentary detail of the main lever with the pawl actuating mechanism mounted thereon.

Fig. 8 is a detail of the main lever and a ratchet wheel upon which said lever is fulcrumed.

Referring now in detail to the various parts, A designates a portion of a mowing machine equipped with the usual mowing mechanism embodying a cutter bar B, knife sections C, and finger guards D.

Referring now more particularly to the parts constituting the present invention, 2 designates a rock shaft extending longitudinally of the rear portion of the cutter bar B and connected thereto by bearings 4 in which said shaft 2 is rockably mounted. The rock shaft 2 is, preferably, cylindrical throughout its length, excepting at its end portions which project laterally beyond the bearings 4, and are preferably rectangular as indicated at 6.

8 and 10 designate a pair of arms fixed upon the rectangular portions 6 of the rock shaft 2, said arms 8 and 10 being provided with rectangular openings into which said rectangular portions 6 snugly fit. The arm 8 is held from lateral movement on the shaft 2 by suitable means such as the adjacent bearing 4, a washer 12, and a cotter pin 14, while the arm 10 is held from lateral movement by the adjacent bearing 4 and a ratchet wheel 16, which has a rectangular opening through which the corresponding portion of the shaft 2 projects. The ratchet wheel 16 is held from lateral displacement upon the shaft 2 by suitable means such as a washer 18 and a cotter pin 20.

The arms 8 and 10 are provided at their lower ends with antifriction means in the form of wheels or rollers 22 and 24, respectively, which carry the weight of the attachment and the mowing mechanism when the same is in operation. As the greatest weight is on the wheel 24 the same is made longer than the wheel 22 and has a bevel portion 26, so that it will more readily turn corners.

28 designates a main lever fulcrumed at its lower bifurcated portion 29 upon the circular shoulders 30 on opposite sides of the ratchet wheel 16. The main lever 28 extends upwardly to within convenient reach of the driver and is provided at its handle 31 with a supplemental lever 32, fulcrumed at 33 and loosely connected to the upper end of a flexible rod 34 mounted in guides 36 and connected at its lower end to a pawl 38, engaging the ratchet wheel 16 and connected at its upper end by a pivot 40 to the bifurcated lower portion 29 of said main lever 28.

The main lever 28 is also provided at its handle portion 31 with a rock lever 44 mounted in bearings 46 and provided at one end with a crank arm 48 pivotally connected to the upper end of a rod 50 mounted in guides 52 and loosely connected at its lower end by suitable means such as a chain 54 to a detent 56, pivotally connected to a lug 58 projecting upwardly from the cutter bar B.

In practice the attachment is connected to the cutter bar B by merely drilling four holes in the latter to receive the bolts 5 whereby the bearings 4 are connected to said cutter bar B. When it is desired to raise the mowing mechanism to any height within the scope of the attachment the main lever 28 is swung backwardly and forwardly until the desired height has been attained. At each backward stroke of the lever 28 the pawl 38 rotates the ratchet wheel 16 backwardly, which in turn rotates the shaft 2 in a direction to raise the attached ends of the arms 8 and 10 and the mowing mechanism. At each forward stroke of the lever 28 the detent 56 holds the ratchet wheel 16 from rotating forwardly and allowing the upper ends of the arms 10 and the mowing mechanism to move downwardly towards the ground.

When it is desired to lower the mowing mechanism the lever 28 is swung backwardly and the rock lever 44 is manipulated to disengage the detent 56 from the ratchet wheel 16. The lever 28 is then swung forwardly and the supplemental lever 32 is actuated to disengage the pawl 38 from the ratchet wheel 16, so that the same may rotate forwardly and lower the upper ends of the arms 8 and 10.

After the attachment has been applied to the mowing machine it need not be removed as it will not interfere with the ordinary operation of said machine when mowing grass or grain close to the ground. Neither will it interfere with the raising of the mowing mechanism preparatory to going to and from the field or in passing through a gate.

From the foregoing description it is apparent that I have produced an attachment embodying the advantages above pointed out, and while I have shown and described the preferred construction, combination and arrangement of parts I reserve the right to make such changes as properly fall within the spirit and scope of the claims.

Having thus described my invention, what I claim and desire to secure by Letters Patent, is:

1. In combination with the cutter bar of a mowing machine, bearings fixed thereto, a rock shaft mounted in said bearings, arms secured to said rock shaft, rollers on which said arms are mounted, a ratchet wheel fixed to the rock shaft, and means for turning said ratchet wheel to raise or lower the arms together with the cutter bar, substantially as described.

2. In combination with the cutter bar of a mowing machine, bearings fixed thereto, a rock shaft mounted in said bearings, arms secured to said rock shaft, rollers on which said arms are mounted, a ratchet wheel fixed to the rock shaft, a pawl mounted on the cutter bar to normally secure said ratchet wheel from turning, a hand lever fulcrumed on the ratchet wheel, means carried by said lever for disengaging said pawl from the ratchet wheel, and mechanism mounted on the lever to coact therewith in turning the ratchet wheel to raise and lower the arms together with the cutter bar, substantially as described.

In testimony whereof I affix my signature, in the presence of two witnesses.

CHAN DENTON.

Witnesses:
ELLA M. BUNDY,
R. O. BUNDY.